Figure 1:
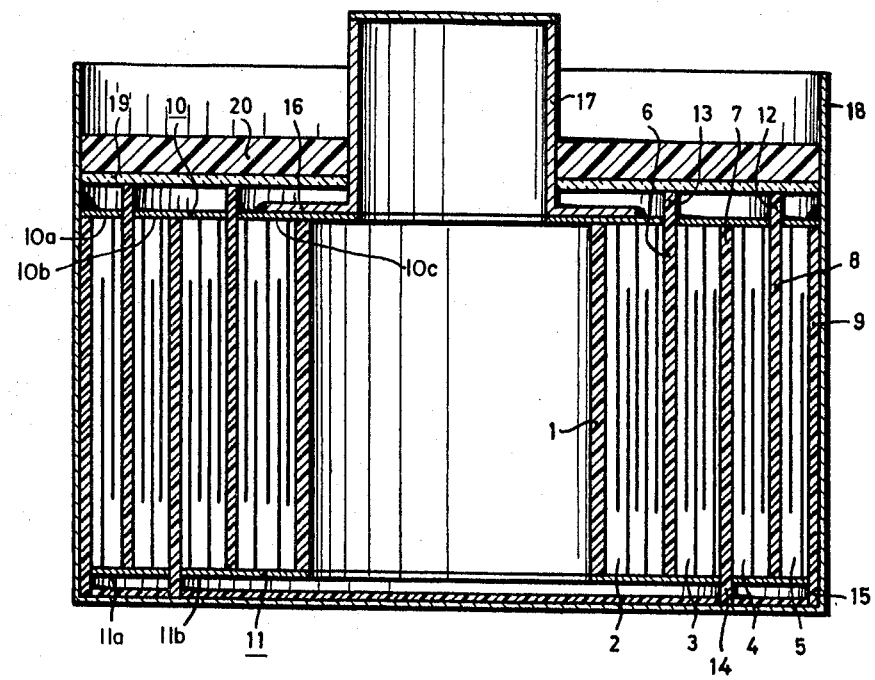

Jan. 31, 1967   K. H. PREISSINGER   3,302,082
HIGH-VOLTAGE CAPACITOR OF LOW INDUCTANCE
Filed May 24, 1965

United States Patent Office 3,302,082
Patented Jan. 31, 1967

3,302,082
HIGH-VOLTAGE CAPACITOR OF LOW INDUCTANCE
Karl Heinz Preissinger, Munich, Germany, assignor to Siemens & Halske Aktiengesellschaft, Berlin, Germany, a corporation of Germany
Filed May 24, 1965, Ser. No. 463,450
Claims priority, application Germany, Nov. 30, 1961, S 76,908
4 Claims. (Cl. 317—260)

This application is a continuation-in-part of my co-pending application, Serial No. 240,542, filed November 28, 1962, now abandoned.

My invention relates to a front-contacted high-voltage capacitor of low inductance of a type consisting of at least four coaxial and electrically series connected component capacitors of which each two form a coaxial system whose external inductivity is compensated to a great extent.

Capacitors of this general type are suitable for producing short but extremely powerful current pulses as employed, for example, for plasma-physical purposes. For highest possible energy content of such discharge pulses the capacitors must be rated for extremely high voltages, for example of about 25 kv. To afford shortest possible discharge periods, the total inductivity of the electric discharge circuits, particularly the inductance of the capacitors themselves, must be kept as low as possible.

It is known to compose a capacitor of low inductivity from concentrically arranged components. For example, hollow wound capacitors have been disposed coaxially above each other and provided with front-contact layers. In such capacitors the magnetic fields produced by the discharge current flowing through the inner current path between opposingly poled front-contact layers, cancel to a great extent the fields produced by the current flowing in the opposite direction through the outer current path concentrical to the inner path.

It is an object of my invention to further improve such capacitors to secure a still lower inductivity and to also increase the voltage breakdown strength thus affording such capacitors to be used for a higher rated voltage for given capacitor dimensions, or reducing the capacitor dimensions for a given rated voltage.

To achieve these objects, and in accordance with a feature of my invention, I form the capacitor of at least four tape-wound portions coaxially arranged one above the other, and I separate the wound capacitor portions by coaxially intermediate partitions formed of a few layers of highly insulating tape, for example of synthetic plastic, and protruding alternately on opposite axial sides beyond the capacitor portions. I further dispose the terminal-contact layers on both axial sides of the composite capacitor between the protruding portions of the intermediate insulating partitions so that the contact layers electrically interconnect the wound capacitor portions in series with each other.

The intermediate inserts are preferably made of polyethylene terephthalate foil whose high insulating ability permits the use of very thin inserts.

It is further preferable to employ as capacitor electrodes thin metal coatings vaporized onto dielectric tape. The metallization is preferably given such a small thickness as to be capable of regeneration. By virtue of such metallized tapes the volume of the capacitor can be reduced and the adhesion of the front contact layers improved.

According to another feature of my invention it is further of advantage to provide the capacitor with coaxial connecting or terminal members of tubular shape in order to prevent increasing the inductivity of the capacitor by the electric leads attached to the capacitor electrodes. According to a more specific feature, one axial side of the innermost wound capacitor portion is soldered to a tubular terminal structure or to a flange of such a structure, and the front side of the outermost capacitor portion is soldered to another tubular terminal member which coaxially surrounds the first-mentioned tubular member. According to still another feature of my invention, the outer tubular terminal member preferably constitutes a peripheral portion of the capacitor housing or can.

To minimize the inductivity of the entire wound structure, its inner diameter is preferably made as large as feasible. It is of advantage, therefore, to keep this inner diameter at least so large that the ratio of inner diameter to outer diameter of the capacitor is larger than 1:3.

For highest possible voltage resistance of the component capacitor portions, the above-mentioned dielectric of the capacitor consists preferably of a mixed dielectric formed of paper and voltage-resistant synthetic plastic, the paper being impregnated with an insulating medium.

Figure 2:
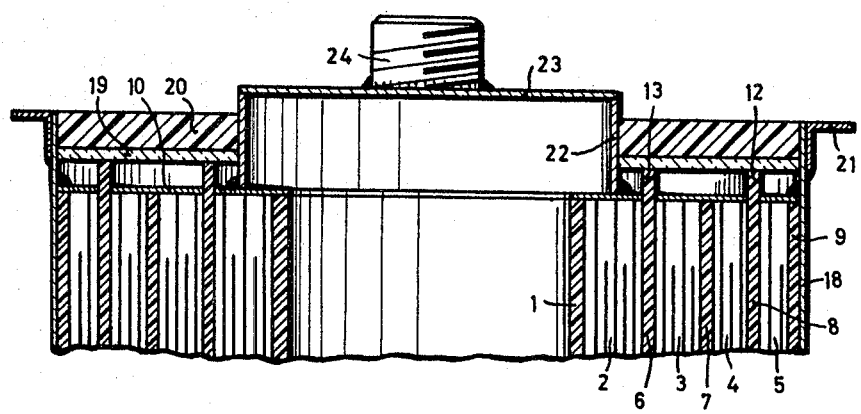

The invention will be further described and explained with reference to embodiments of high-voltage capacitors of low inductance according to the invention illustrated by way of example in the accompanying drawings, in which:

FIG. 1 is a cross-sectional view along a diametrical plane of an embodiment of the capacitor of the present invention; and FIG. 2 is a cross-sectional view generally similar to that of FIG. 1, of another embodiment of the capacitor of the present invention, illustrating only the top portion thereof.

Wound upon a core tube 1 of insulating material and upon each other are four capacitor portions 2, 3, 4 and 5, each comprising a number of turns wound of metallized dielectric tape as described in the foregoing. Wound between each two of these component capacitor portions are tubular inserts 6, 7, 8, and 9 of polyethylene terephthalate foil and comprising each a few layers of such foil. The upper portions 12 and 13 of the coaxial inserts 6 and 8 protrude upwardly beyond the wound capacitor portions. The lower portions 14 and 15 of the two other insulating inserts 7 and 9 protrude downwardly beyond the capacitor portions. The axial sides of the capacitor electrodes formed by the metal coating on the capacitor windings are covered by ring-shaped coaxial layers of contact metal 10a, 10b, 10c (jointly denoted by 10) and 11a, 11b (jointly denoted by 11). The front contact layers 10, 11 are subdivided by the protruding portions 12, 13, 14 and 15 of the insulating inserts 6, 7, 8 and 9 respectively and thus electrically connect the capacitor portions 2, 3, 4 and 5 in series.

A contacted front surface of the innermost capacitor portion 2 is soldered to the flange 16 of a terminal tube 17 of metal. A front surface of the outermost capacitor portion 5 is soldered to an outer tubular member 18 of metal which in the illustrated embodiment forms the peripheral wall of the can which protectively encloses the entire capacitor structure. The top of the capacitor envelope is covered by an insulating annular disc 19 preferably of synthetic plastic, for example of the material available in the trade under the name Plexiglas, and the disc 19 is covered by a sealing mass 20 for example of epoxy resin.

The embodiment illustrated in FIG. 2 has its outer tubular member provided with a flange ring 21. Instead of joining the terminal tube 17 at its flange 16 with the front contact layer 10 as in the embodiment of FIG. 1, the capacitor according to FIG. 2 is provided with a tubular structure 22 whose lower edge forms a butt joint with the front contact layer 10 and is peripherally soldered thereto. The tube 22 is covered and sealed by means of a plate 23 which carries a threaded mounting stub 24.

By virtue of the fact that the individual capacitor portions are wound upon each other, the spacing between the currents flowing during capacitor discharge in the component capacitors can be minimized so that the compensation of the magnetic fields formed by the inner and outer current paths is particularly effective and results in an extremely low inductivity. On the other hand, the use of highly insulating tape of synthetic plastic for producing the insert partitions 6, 7, 8, 9 between the individual capacitor windings secures a sufficient voltage strength. The protruding portions 12, 13, 14, 15 of these inserts prevent the occurrence of surface creep currents and voltage break-throughs and also permit employing the front-contacting method for producing the electric connection between the component capacitor windings and the contacting of all of these windings in a single operation simply by spraying metal upon the two axial sides of the capacitor structure. The protruding portions 12, 13, 14, 15 of the inserts then take care that the metal-spraying operation does not inadvertently form electric connections at those localities where adjacent front faces of the capacitor portions must remain insulated from each other, whereas at those other localities where no such protruding portion is present, the deposition of the front-contact layers automatically produces the connection between the proper capacitor front surfaces that must be electrically joined for obtaining the desired series connection. To prevent metal from being deposited upon the protruding edges of the insulating inserts, these edges can be covered or masked off in a suitable manner.

A capacitor according to the invention as described above and shown on the drawing, rated for a shock-current discharge of 20 kv. and possessing a capacitance of 1 µf. was found to have an inductivity of only 10 nh.

How such extremely low inductivities in capacitors according to the invention come about, will be understood from the following. In the series connection of the capacitors portions formed by the ring-shaped, coaxial contact layers 10, 11 and the coaxial terminals 17 and 18, the direction of current flow in each capacitor portion is opposed to that in the next adjacent capacitor portion. Hence, the magnetic fields of each two adjacent capacitor portions substantially compensate each other, thus minimizing the internal inductivity of the capacitor as a whole. Since the terminal members (17, 18 in FIG. 1; 22, 18 in FIG. 2) are coaxial structures and in contact along substantially the entire circumference of the innermost and outermost capacitor portions on one and the same axial side of the capacitor, the formation of an inductive current loop from the terminals through the capacitor portions is likewise minimized, thus greatly reducing the external inductivity of the capacitor. It will be recognized that this requires providing an even number of component capacitor portions.

I claim:

1. A high-voltage capacitor of low inductance, comprising an even number of at least four component capacitor portions coaxially tape wound on each other and positioned about an axis between a pair of spaced predetermined end planes substantially perpendicular to said axis; an intermediate layer of windings of insulating material coaxially interposed between each two adjacent ones of said capacitor portions, alternate ones of said insulating layers extending in one axial direction beyond said capacitor portions at one of said end planes and alternate others of said insulating layers extending in the opposite axial direction beyond said capacitor portions at said other end plane; a first layer of a plurality of conducting metal coatings electrically contacting said respective capacitor portions in said one end plane between said alternate ones of said insulating layers, and a second layer of a plurality of conducting metal coatings electrically contacting said respective capacitor portions in said other end plane between said alternate other insulating layers, said metal coatings in each of said planes forming coaxial rings about said axis and each of said coatings extending radially between two successive ones of said insulating layers, the totality of said coatings joining said component capacitor portions electrically in a series connection having its two ends located on the same axial side of said coaxial capacitor portions; two coaxial terminal members insulated from each other and conductively joined with said respective ends around the circumference thereof, one of said terminal members surrounding said other terminal member on said same axial side in coaxial relation to said capacitor portions; whereby said capacitor has a substantially compensated external inductivity, said coaxial terminal members being formed of respective inner and outer tubular structures, the innermost one of said capacitor portions being conductively connected with said inner tubular structure substantially along the entire periphery of said innermost capacitor portion at said one end plane, and the outermost capacitor portion being conductively connected with said outer tubular structure substantially along the entire periphery of said outermost capacitor portion at said one plane.

2. A capacitor according to claim 1, comprising a metal can enclosing the capacitor, said outer tubular structure forming a peripheral portion of said can.

3. A capacitor according to claim 1, having a ratio of inner to outer diameters larger than 1 to 3.

4. A high-voltage shock-current discharge capacitor of low inductance comprising an even number of at least four component capacitor portions coaxialy wound on each other and positioned about an axis between a pair of spaced predetermined end planes substantially perpendicular to said axis, said component capacitor portions comprising dielectric tape having a metal coating thereon; an intermediate insulating layer of windings of synthetic plastic coaxially interposed between each two adjacent ones of said capacitor portions, alternate ones of said insulating layers extending in one axial direction beyond said capacitor portions at one of said end planes and alternate others of said insulating layers extending in the opposite axial direction beyond said capacitor portions at said other end plane; first electrical contact means electrically contacting said capacitor portions in said one end plane between said alternate ones of said insulating layers, second electrical contact means electrically contacting said capacitor portions in said other end plane between said alternate other insulating layers, each of said contact means consisting of a metal deposition and forming a ring about said axis and extending radially between two successive ones of said insulating layers, the totality of said ring-shaped metal depositions forming with said capacitor portions an electrical series connection; and two coaxial terminal members electrically connected with the respective innermost and outermost ones of said capacitor portions and along the entire peripheries of said latter portions respectively, one of said terminal members surrounding the other in coaxial relation to said capacitor portions at the side of one of said planes, and forming a can in which said capacitor portions are mounted.

References Cited by the Examiner

UNITED STATES PATENTS

| | | | |
|---|---|---|---|
| 2,119,113 | 4/1938 | Olving | 317—260 |
| 2,443,605 | 6/1948 | Lange | 317—260 X |
| 3,014,167 | 12/1961 | Winter | 317—260 |

OTHER REFERENCES

McCutchen, C. W. et al.: Low Impedance Capacitor Design, in Electronics Engineering, pp. 349–353, June 1961.

LARAMIE E. ASKIN, *Primary Examiner.*

JOHN F. BURNS, *Examiner.*

E. GOLDBERG, *Assistant Examiner.*